(12) United States Patent
Hill et al.

(10) Patent No.: US 8,707,276 B2
(45) Date of Patent: Apr. 22, 2014

(54) METHOD AND SYSTEM FOR MANAGING PROGRAMMED APPLICATIONS IN AN OPEN API ENVIRONMENT

(75) Inventors: Gregg Alan Hill, Lake Saint Louis, MO (US); Tamara Lynn Arrington, Wentzville, MO (US); Adam Kenneth Hosp, Lake Saint Louis, MO (US)

(73) Assignee: MasterCard International Incorporated, Purchase, NY (US)

( * ) Notice: Subject to any disclaimer, the term of this patent is extended or adjusted under 35 U.S.C. 154(b) by 472 days.

(21) Appl. No.: 12/986,743

(22) Filed: Jan. 7, 2011

(65) Prior Publication Data

US 2012/0180029 A1 Jul. 12, 2012

(51) Int. Cl.
*G06F 9/44* (2006.01)
*G06F 15/16* (2006.01)

(52) U.S. Cl.
USPC ........... 717/135; 717/101; 717/125; 717/127; 709/202

(58) Field of Classification Search
None
See application file for complete search history.

(56) References Cited

U.S. PATENT DOCUMENTS

| | | | |
|---|---|---|---|
| 5,355,484 A * | 10/1994 | Record et al. | 717/127 |
| 6,002,871 A * | 12/1999 | Duggan et al. | 717/135 |
| 6,005,942 A | 12/1999 | Chan et al. | |
| 6,115,744 A * | 9/2000 | Robins et al. | 709/227 |
| 6,385,606 B2 | 5/2002 | Inohara et al. | |
| 6,481,632 B2 | 11/2002 | Wentker et al. | |
| 6,560,581 B1 | 5/2003 | Fox et al. | |
| 6,567,828 B2 | 5/2003 | Inohara et al. | |
| 6,618,856 B2 * | 9/2003 | Coburn et al. | 717/135 |
| 6,741,992 B1 | 5/2004 | McFadden | |
| 7,003,661 B2 | 2/2006 | Beattie et al. | |
| 7,167,448 B2 | 1/2007 | Wookey et al. | |
| 7,213,235 B2 * | 5/2007 | Ziv | 717/135 |
| 7,383,231 B2 | 6/2008 | Gupta et al. | |
| 7,426,737 B2 | 9/2008 | Hellenthal et al. | |
| 7,566,002 B2 | 7/2009 | Love et al. | |
| 7,647,493 B2 | 1/2010 | Bajko et al. | |
| 7,652,990 B2 | 1/2010 | Bryson | |

(Continued)

FOREIGN PATENT DOCUMENTS

WO 0225495 A1 3/2002

OTHER PUBLICATIONS

Saul Greenberg et al., "Phidgets: Easy Development of Physical Interfaces through Physical Widgets", [Online], ACM 2001, pp. 209-218, [Retrieved from Internet on Dec. 3, 2013], <http://citeseerx.ist.psu.edu/viewdoc/download?doi=10.1.1.186.9414&rep=rep1&type=pdf>.*

(Continued)

*Primary Examiner* — Thuy Dao
*Assistant Examiner* — Ziaul A Chowdhury
(74) *Attorney, Agent, or Firm* — Armstrong Teasdale LLP

(57) ABSTRACT

A method and system for an open application programming interface (API) dashboard system for monitoring and managing one or more developer programmed applications configured to use one or more services provided by a service owner are provided. The system includes an application area associated with a corresponding programmed application, each application area including a call metrics group configured to display summarized metrics, a services used group configured to display a listing of each service called by the programmed application and metrics associated with each service, and a key management group configured to prompt a developer of the programmed application to request or revoke a key, wherein the key includes a developer identification, a programmed application identification, and signed certificates relating to services used by the programmed application.

16 Claims, 10 Drawing Sheets

(56) References Cited

U.S. PATENT DOCUMENTS

| | | | |
|---|---|---|---|
| 7,660,902 B2 | 2/2010 | Graham et al. | |
| 7,681,206 B2 | 3/2010 | Oh et al. | |
| 7,698,398 B1 | 4/2010 | Lai | |
| 7,712,085 B2 | 5/2010 | McCollum et al. | |
| 7,747,569 B2 | 6/2010 | Comi et al. | |
| 7,826,829 B2 | 11/2010 | Pousti | |
| 7,849,010 B2 | 12/2010 | Deyoe et al. | |
| 7,860,484 B2 | 12/2010 | Pousti | |
| 8,001,555 B2 | 8/2011 | Hellenthal et al. | |
| 8,171,074 B2* | 5/2012 | Nakazawa | 709/202 |
| 8,490,080 B2* | 7/2013 | Janzen | 717/174 |
| 2002/0004773 A1 | 1/2002 | Xu et al. | |
| 2002/0032665 A1 | 3/2002 | Creighton et al. | |
| 2002/0120546 A1 | 8/2002 | Zajac | |
| 2003/0135639 A1 | 7/2003 | Marejka et al. | |
| 2003/0237073 A1* | 12/2003 | Gardas et al. | 717/116 |
| 2004/0111379 A1 | 6/2004 | Hicks et al. | |
| 2004/0139021 A1 | 7/2004 | Reed et al. | |
| 2005/0069136 A1 | 3/2005 | Thornton et al. | |
| 2005/0114367 A1 | 5/2005 | Serebrennikov | |
| 2005/0157646 A1 | 7/2005 | Addagatla et al. | |
| 2005/0166262 A1 | 7/2005 | Beattie et al. | |
| 2006/0015463 A1 | 1/2006 | Gupta et al. | |
| 2006/0184452 A1 | 8/2006 | Barnes et al. | |
| 2006/0195401 A1 | 8/2006 | Davis et al. | |
| 2006/0242151 A1 | 10/2006 | Jogand-Coulomb et al. | |
| 2006/0248205 A1 | 11/2006 | Randle et al. | |
| 2007/0074034 A1 | 3/2007 | Adams et al. | |
| 2007/0162898 A1* | 7/2007 | Ramani et al. | 717/135 |
| 2008/0046279 A1* | 2/2008 | Leahy et al. | 705/1 |
| 2008/0052373 A1 | 2/2008 | Pousti | |
| 2008/0077560 A1 | 3/2008 | Comi et al. | |
| 2008/0177889 A1 | 7/2008 | Beyer et al. | |
| 2008/0194228 A1 | 8/2008 | Pousti et al. | |
| 2008/0209094 A1 | 8/2008 | Travis | |
| 2008/0209451 A1* | 8/2008 | Michels et al. | 719/328 |
| 2008/0288624 A1* | 11/2008 | Armangil | 709/223 |
| 2009/0094584 A1 | 4/2009 | Dheap et al. | |
| 2009/0132536 A1 | 5/2009 | Brown et al. | |
| 2009/0219940 A1* | 9/2009 | Jansson | 370/401 |
| 2009/0249071 A1* | 10/2009 | De Atley et al. | 713/171 |
| 2009/0254482 A1 | 10/2009 | Vadlamani et al. | |
| 2009/0313069 A1 | 12/2009 | Love et al. | |
| 2009/0320050 A1 | 12/2009 | Pousti et al. | |
| 2009/0327139 A1 | 12/2009 | Shah et al. | |
| 2009/0328174 A1* | 12/2009 | Cen et al. | 726/7 |
| 2010/0057774 A1 | 3/2010 | Pizano et al. | |
| 2010/0100398 A1 | 4/2010 | Auker et al. | |
| 2010/0115585 A1 | 5/2010 | Cohen | |
| 2010/0138316 A1 | 6/2010 | Connors et al. | |
| 2010/0146487 A1* | 6/2010 | Chun et al. | 717/126 |
| 2010/0188992 A1 | 7/2010 | Raleigh | |
| 2010/0192120 A1* | 7/2010 | Raleigh | 717/101 |
| 2010/0232594 A1 | 9/2010 | Lawson et al. | |
| 2010/0250748 A1 | 9/2010 | Sivasubramanian et al. | |
| 2010/0251242 A1 | 9/2010 | Sivasubramanian et al. | |
| 2010/0262956 A1* | 10/2010 | Okada | 717/166 |
| 2010/0275012 A1 | 10/2010 | Kido et al. | |
| 2010/0306072 A1 | 12/2010 | Ford, Jr. et al. | |
| 2011/0113405 A1* | 5/2011 | Guerrera et al. | 717/125 |
| 2011/0153590 A1 | 6/2011 | Chang et al. | |
| 2011/0154027 A1 | 6/2011 | Liu et al. | |
| 2011/0154130 A1 | 6/2011 | Helander et al. | |
| 2011/0154302 A1* | 6/2011 | Balko et al. | 717/140 |
| 2011/0184866 A1 | 7/2011 | Shakkarwar | |
| 2011/0196914 A1* | 8/2011 | Tribbett | 709/203 |
| 2011/0296440 A1 | 12/2011 | Laurich et al. | |
| 2012/0017222 A1* | 1/2012 | May | 719/328 |

OTHER PUBLICATIONS

Jit Biswas et al., "The IEEE P1520 Standards Initiative for Programmable Network Interface", [Online], IEEE1998, pp. 64-70, [Retrieved from Internet on Dec. 3, 2013], <http://ieeexplore.ieee.org/stamp/stamp.jsp?tp=&arnumber=722138>.*

Zhengyu Liang et al., "ClusterProbe: An Open, Flexible and Scalable Cluster Monitoring Tool", [Online], IEEE 1999, pp. 1-10, [Retrieved from Internet on Dec. 3, 2013], <http://citeseerx.ist.psu.edu/viewdoc/download?doi=10.1.1.37.4540&rep=rep1&type=pdf>.*

Gabrielle Allen et al., "The Grid Application Toolkit: Toward Generic and Easy Application Programming Interfaces for the Grid", [Online], IEEE 2005, pp. 534-550, [Retrieved from Internet on Dec. 3, 2013], <http://tangviz.cct.lsu.edu/papers/allen-ieee04-gat.pdf>.*

International Search Report, dated Jun. 15, 2012, for co-pending PCT patent application No. PCT/US2011/067208, filed Dec. 23, 2011.

International Search Report and Written Opinion for International Application No. PCT/US11/67517, dated Mar. 20, 2012.

Kang, J., "IDB: Unified Query Interface for Information on the Web," University of Wisconsin-Madison, Oct. 22, 1999, www4.ncsu.edu/~jkang2/pubs/IDBMSproposal99.pdf (6 pages).

International Search Report and Written Opinion for International Application No. PCT/US11/67189 mailed Feb. 21, 2012 (11 pgs).

International Search Report for International Application No. PCT/US11/67181 mailed Apr. 18, 2012 (11 pgs).

International Search Report for International Application No. PCT/US11/67522 mailed Apr. 15, 2013.

International Search Report and Written Opinion for International Application No. PCT/US11/67201 mailed Apr. 18, 2012 (10 pgs).

* cited by examiner

INVITE A VIEWER

Please type in the email address of the user you would like to add as a viewer. If they are a registered user of the Developer Portal they will be added as a viewer for your dashboard, if they are not a registered user we will send them an email inviting them to register.

E-mail Address [                    ]
                        ↳702

Submit    Cancel

FIG. 7

Get a Key

Developer Zone | API | Community | Support | My Account | Logout | Search

Application Type:
Will this application be personal or commercial

● Personal   ○ Commercial — 1002

Application Info:
Application Name: _____ — 1004

Application Description: _____ — 1006

Additional Notes: _____ — 1008

API Needs (Daily): Select... — 1010

Will this application generate profit? ○ Yes  ● No — 1012
— 1014

Certificate Request (CSR)
In order to get a Key, you need to supply a PEM encoded Certificate Request File. You may use a tool of your choice, such as "openssl" or Java's "keytool" to generate this CSR, or may click here to use our simple CSR generation tool. This tool requires that Sun/Oracle Java is installed on your system.

Certificate Request File: _____ Browse... — 1016

Submit — 1018

FIG. 10

METHOD AND SYSTEM FOR MANAGING PROGRAMMED APPLICATIONS IN AN OPEN API ENVIRONMENT

BACKGROUND OF THE INVENTION

This invention relates generally to managing programmed applications an open application programming interface (API) system and, more particularly, to network-based methods and systems for providing a programmed application management tool to developers of the programmed applications that use a service provider computer system through an open API architecture.

There are service provider companies that provide a variety of services to numerous consumers. These service provider companies utilize computer systems to provide these services. For example, in the financial industry, companies such as large banks, interchange networks and payment networks provide certain financial services to consumers, companies and other banks. Oftentimes, these service provider companies provide services that include receiving, processing and storing financial data in computer systems managed by the service provider companies. In many cases, access to this financial data is restricted to certain approved users. Restricting access to such financial data provides at least some protection for the data, but also limits the potential uses of the data.

Software developers around the world are able to develop computer programs, sometimes called applications that are configured to utilize data such as the data stored within computer systems used by certain service provider companies. Of course, in order for these computer programs to use such data, the developer programs must be able to access the data. One way to access the data stored by these service provider companies is through an open application programming interface (API).

By allowing software developers to access data stored within computer system used by these service provider companies, the service provider companies are able to leverage these developer applications as well as drive up their transaction volume. Thus, by providing this data access to developers, these service provider companies are able to provide additional services to both existing and new customers, which in turn improves profitability. However, the providing of such data access also creates certain risks and challenges for the service provider companies.

Accordingly, it is desirable to provide an open API architecture for certain service provider companies such as financial transaction companies that is configured to (i) provide secure access to data stored within the computer systems used by these service provider companies, (ii) control access to the data, and (iii) manage billing associated with providing said access.

Managing applications is cumbersome and time-consuming. Each developer may produce many different applications for many different third-party users of the service provider data. Managing such applications, including billing issues, version updates, customer customization, and services requested may slow the adoption of developer provided programmed applications.

BRIEF DESCRIPTION OF THE INVENTION

In one embodiment, an open API dashboard system for monitoring and managing one or more developer programmed applications configured to use one or more services provided by a service owner includes at least one application area associated with a corresponding programmed application, each at least one application area including a call metrics group configured to display summarized metrics relative to service calls made by the programmed application, a services used group configured to display a listing of each service called by the programmed application and metrics associated with each service, and a key management group configured to prompt a developer of the programmed application to request or revoke a key, wherein the key includes a developer identification, a programmed application identification, and signed certificates relating to services used by the programmed application. The system also includes a side bar area configured to prompt a developer to request information or help relating to the application area.

In another embodiment, a method of managing one or more programmed applications includes receiving, through a graphical user interface (GUI), a request for an application programming interface (API) key associated with a programmed application by a developer, the API key permitting interaction of the programmed application and an API platform comprising a plurality of APIs. The method also includes receiving, through the graphical user interface (GUI), developer identification data specific to the developer and the programmed application, generating a client identification number associated with the key request using the developer identification data, and generating at least one of a temporary memory programmed application key and a production programmed application key.

In yet another embodiment, a computer system for managing one or more programmed applications includes a database for storing data; and a computer device comprising a processor in communication with the database wherein the computer device is programmed to prompt a developer to register with the computer system wherein registering includes entering by the developer predetermined developer identification information and verifying by the computer system at least some of the predetermined developer information. The computer device is further programmed to receive a request from the developer for a sandbox key, the request including an encoded certificate request file associated with the developer and provide a sandbox key to the developer, the sandbox key including a client identification (ID) and a certificate signed by the computer system. The computer device is still further programmed to receive a message from the developer that include the provided sandbox key and provide access to a copy of at least one Open API service in a test/validation environment using simulators based on an authentication of the sandbox key provided in the message and provide a response to the received message that simulates a response that would be provided to a similar message in a production environment.

BRIEF DESCRIPTION OF THE DRAWINGS

FIGS. 1-11 show exemplary embodiments of the method and system described herein.

FIG. 1 is a simplified block diagram of an exemplary service providing computer system including a service provider computer system in accordance with one embodiment of the present invention.

FIG. 2 is an expanded block diagram of an exemplary embodiment of a server architecture of a service providing computer system in accordance with one embodiment of the present invention.

FIG. 3 is a block diagram of an exemplary embodiment of a user computer device as shown in FIGS. 1 and 2.

FIG. 4 is a block diagram of an exemplary embodiment of a server computer device as shown in FIGS. 1 and 2.

FIG. 5 is a more detailed block diagram of an exemplary configuration of a service provider computer system as shown in FIGS. 1 and 2.

FIG. 6 is a screenshot of an open API developer dashboard function of the web-based open API implementation portal, in accordance with exemplary embodiments of the present invention.

FIG. 7 is a screen shot of a pop-up window that may be called from the dashboard shown in FIG. 6 in accordance with an exemplary embodiment of the present invention.

FIG. 8 is a screen shot of a pop-up window that may be called from dashboard shown in FIG. 6) in accordance with an exemplary embodiment of the present invention.

FIG. 9 is a screen shot of a pop-up window that may be called from dashboard shown in FIG. 6 in accordance with an exemplary embodiment of the present invention.

FIG. 10 is a screen shot of a pop-up window that may be called from dashboard shown in FIG. 6 in accordance with an exemplary embodiment of the present invention.

FIG. 11 is a schematic data flow diagram illustrating a developer's interaction with the service provider Open API sandbox environment.

DETAILED DESCRIPTION OF THE INVENTION

Figure 1:
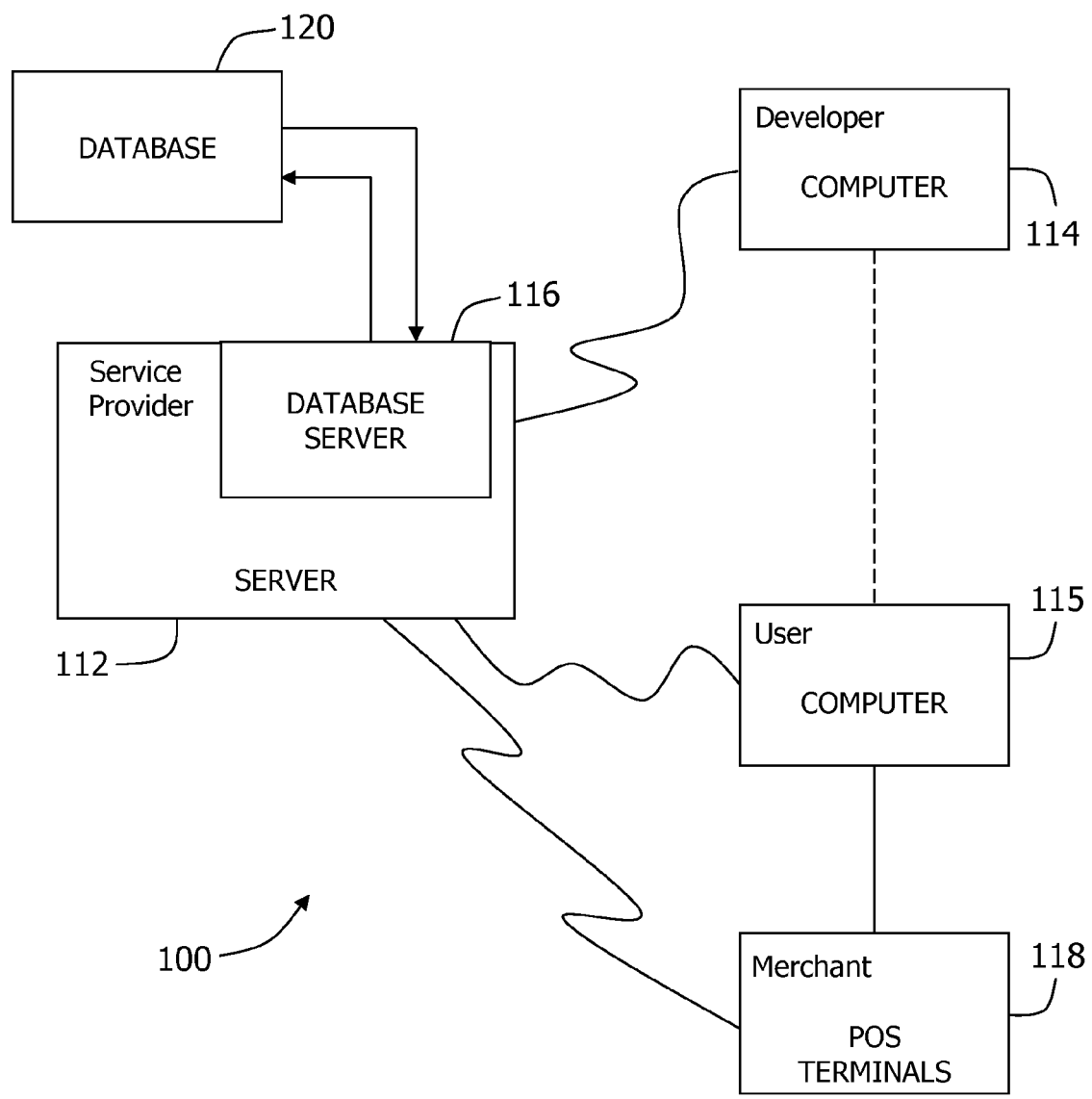

Embodiments of the methods and systems described herein enable an owner of a service provider computer system, which includes service applications stored therein, to facilitate management of access to the service applications for use by developers of computer applications. The developers access the service applications stored within the service provider (SP) computer system through a developer portal and an application programming interface (API) platform. To ease the burden of managing all the programmed applications and associated access keys a developer may be responsible for, the service provider computer system is equipped with a software tool dashboard. The developers use data from the service applications in response to executing a developer application. A developer uses a developer computer system to send a request for access to a selected service application stored on the SP computer system by accessing the developer portal, and the API platform through the dashboard, which receives and forwards the developer requests to a service owner (SO) of selected service applications. The SO approves or denies the developer request. Each SO being an owner of a particular service or set of services included within the overall SP computer system.

In the example embodiment, the service provider computer system is a financial service computer system that provides financial services to developers, consumers, merchants, acquirers and/or issuers. The services may include providing data representing financial transactions, processing payment card transactions, locating banks or ATMs, etc.

The following detailed description illustrates embodiments of the invention by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to an exemplary embodiment, namely, systems and methods of managing one or more programmed applications by a developer in an open API architecture. However, it is contemplated that this disclosure has general application to software program management tools in industrial, commercial, and residential applications.

As used herein, an element or step recited in the singular and preceded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

To improve commercial transactions, a financial service provider may open previously proprietary payments and data services to third-party and independent software developers around the world using an Open Application Programming Interfaces (Open APIs) architecture. The developers can then be able to create a new wave of e-commerce and mobile payment applications. To facilitate use of the open APIs a developer portal including a developer dashboard is also provided to enable developers to easily sign up for access to all of the Open APIs that the service provider makes available.

Through the portal and dashboard, the service provider provides developers with technical documentation, software development kits (SDKs), sample source code, reference guides, and "virtual sandboxes" for testing new and innovative applications. A developer forum designed to spur collaboration between the service provider engineers and developers is also an integral component of the portal.

The Open APIs facilitate the development of new applications and systems beyond those currently available, including CRMs, ERPs, online games, merchant e-commerce web sites, eWallets, mobile applications, and payroll systems. The service provider payment and data services are also integrated with other data sources and functions to create "mashups"—new applications that are a result of combining multiple data sources.

FIG. 1 is a simplified block diagram of an exemplary service system 100 including a plurality of computer devices in accordance with one embodiment of the present invention. System 100 includes a service provider system (e.g., financial services provider) that allows developers of computer applications to access a variety of service applications hosted by the service provider (SP) computer system such that the developer applications can utilize data stored within the SP computer system. The developer applications can be utilized by the developer via a developer computer system or can be offered to a consumer, a merchant, an acquirer or an issuer (collectively a "user") for use by the users via user computer systems.

More specifically, in the example embodiment, system 100 includes a server system 112, which is a type of computer system, and a plurality of client sub-systems (also referred to as client systems 114 and 115) connected to server system 112. In one embodiment, client systems 114, 115 are computers including a web browser, such that server system 112 is accessible to client systems 114, 115 using the Internet. Client systems 114, 115 are interconnected to the Internet through many interfaces including a network, such as a local area network (LAN) or a wide area network (WAN), dial-in-connections, cable modems, and special high-speed ISDN lines. Client systems 114, 115 could be any device capable of interconnecting to the Internet including a web-based phone, personal digital assistant (PDA), or other web-based connectable equipment.

System 100 also includes point-of-sale (POS) terminals 118, which may be connected to client systems 114, 115 and may be connected to server system 112. POS terminals 118 are interconnected to the Internet through many interfaces including a network, such as a local area network (LAN) or a wide area network (WAN), dial-in-connections, cable modems, wireless modems, and special high-speed ISDN lines. POS terminals 118 could be any device capable of interconnecting to the Internet and including an input device capable of reading information from a consumer's financial transaction card.

A database server 116 is connected to database 120, which contains information on a variety of matters, as described below in greater detail. In one embodiment, centralized database 120 is stored on server system 112 and can be accessed by potential users at one of client systems 114, 115 by logging onto server system 112 through one of client systems 114, 115. In an alternative embodiment, database 120 is stored remotely from server system 112 and may be non-centralized.

Database 120 may store transaction data generated as part of sales activities conducted over the services network including data relating to merchants, account holders or customers, developers, issuers, acquirers, purchases made, and services provided by system 100. Database 120 may also store account data including at least one of a cardholder name, a cardholder address, an account number, and other account identifier. Database 120 may also store merchant data including a merchant identifier that identifies each merchant registered to use the network, and instructions for settling transactions including merchant bank account information. Database 120 may also store purchase data associated with items being purchased by a cardholder from a merchant, and authorization request data.

In the example embodiment, client system 114 may be associated with a developer of computer applications and may be referred to as a developer computer device, and client system 115 may be associated with a consumer, an acquirer or an issuer and may be referred to as a user computer device. Developer computer device 114 stores developer applications that a user may access and utilize via user computer device 115. Server system 112 may be associated with a service provider (SP) and may be referred to as a SP computer device. In the example embodiment, an SP may include a payment network provider, an interchange network provider, or any other provider of financial services.

In the embodiment where the SP is an interchange network provider, system 100 includes POS terminals 118, which may be associated with a merchant. In this embodiment, system 100 may be part of a multi-party payment card industry system for enabling ordinary payment-by-card transactions such as a credit card payment system using the MasterCard® interchange. The MasterCard® interchange is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, N.Y.).

For example, in a typical payment card system, a financial institution called the "issuer" issues a payment card, such as a credit card, to a consumer, who uses the payment card to tender payment for a purchase from a merchant. To accept payment with the payment card, the merchant must normally establish an account with a financial institution that is part of the financial payment system. This financial institution is usually called the "merchant bank" or the "acquiring bank" or "acquirer bank". When a consumer tenders payment for a purchase with a payment card (also known as a financial transaction card), the merchant requests authorization from the merchant bank for the amount of the purchase. The request may be performed over the telephone, but is usually performed through the use of a point-of-sale terminal, which reads the consumer's account information from the magnetic stripe on the payment card and communicates electronically with the transaction processing computers of the merchant bank. Alternatively, a merchant bank may authorize a third party to perform transaction processing on its behalf. In this case, the point-of-sale terminal will be configured to communicate with the third party. Such a third party is usually called a "merchant processor" or an "acquiring processor".

Using the interchange network, the computers of the merchant bank or the merchant processor will communicate with the computers of the issuer bank to determine whether the consumer's account is in good standing and whether the purchase is covered by the consumer's available credit line. Based on these determinations, the request for authorization will be declined or accepted. If the request is accepted, an authorization code is issued to the merchant.

When a request for authorization is accepted, the available credit line of consumer's account is decreased. Normally, a charge is not posted immediately to a consumer's account because bankcard associations, such as MasterCard International Incorporated®, have promulgated rules that do not allow a merchant to charge, or "capture", a transaction until goods are shipped or services are delivered. When a merchant ships or delivers the goods or services, the merchant captures the transaction by, for example, appropriate data entry procedures on the point-of-sale terminal. If a consumer cancels a transaction before it is captured, a "void" is generated. If a consumer returns goods after the transaction has been captured, a "credit" is generated.

For debit card transactions, when a request for a PIN authorization is approved by the issuer, the consumer's account is decreased. Normally, a charge is posted immediately to a consumer's account. The bankcard association then transmits the approval to the acquiring processor for distribution of goods/services, or information or cash in the case of an ATM.

After a transaction is captured, the transaction is settled between the merchant, the merchant bank, and the issuer. Settlement refers to the transfer of financial data or funds between the merchant's account, the merchant bank, and the issuer related to the transaction. Usually, transactions are captured and accumulated into a "batch", which is settled as a group.

The financial transaction cards or payment cards discussed herein may include credit cards, debit cards, a charge card, a membership card, a promotional card, prepaid cards, and gift cards. These cards can all be used as a method of payment for performing a transaction. As described herein, the term "financial transaction card" or "payment card" includes cards such as credit cards, debit cards, and prepaid cards, but also includes any other devices that may hold payment account information, such as mobile phones, personal digital assistants (PDAs), and key fobs.

Although the SP has been described herein as an interchange network provider, it does not have to be so limited. As indicated above, the SP may also be a payment network provider or any other provider of financial services. In these embodiments, a transaction card, a payment or even a purchase are not necessarily needed to utilize the services provided by the SP.

Figure 2:
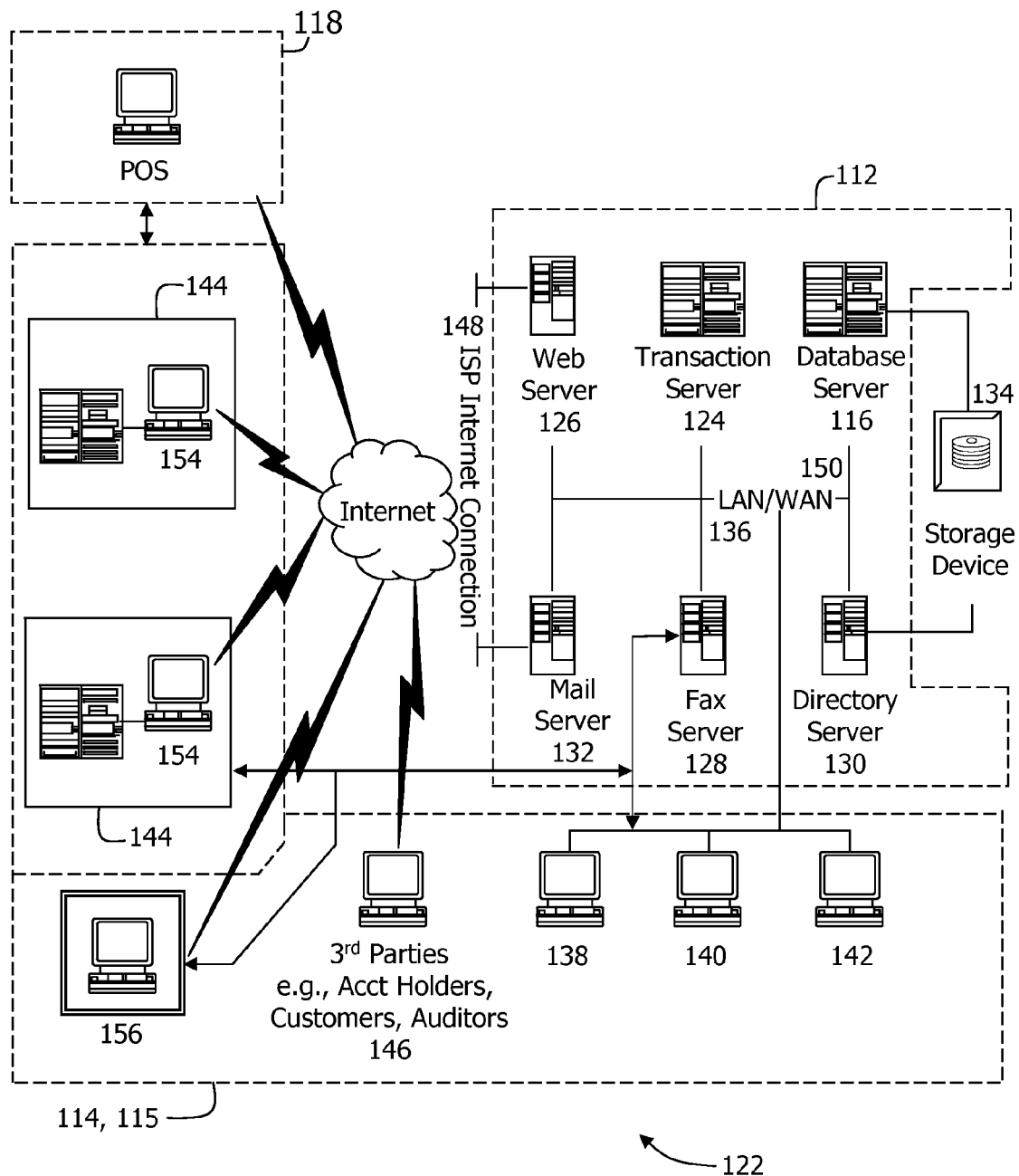

FIG. 2 is an expanded block diagram of an exemplary embodiment of a server architecture of a service system 122 including other computer devices in accordance with one embodiment of the present invention. Components in system 122, identical to components of system 100 (shown in FIG. 1), are identified in FIG. 2 using the same reference numerals as used in FIG. 1. System 122 includes server system 112, client systems 114 and 115, and POS terminals 118. Server system 112 further includes database server 116, a transaction server 124, a web server 126, a fax server 128, a directory server 130, and a mail server 132. A storage device 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, developers, consumers, merchants, acquirers, issuers, etc., 146 using an ISP Internet connection 148. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

Figure 3:
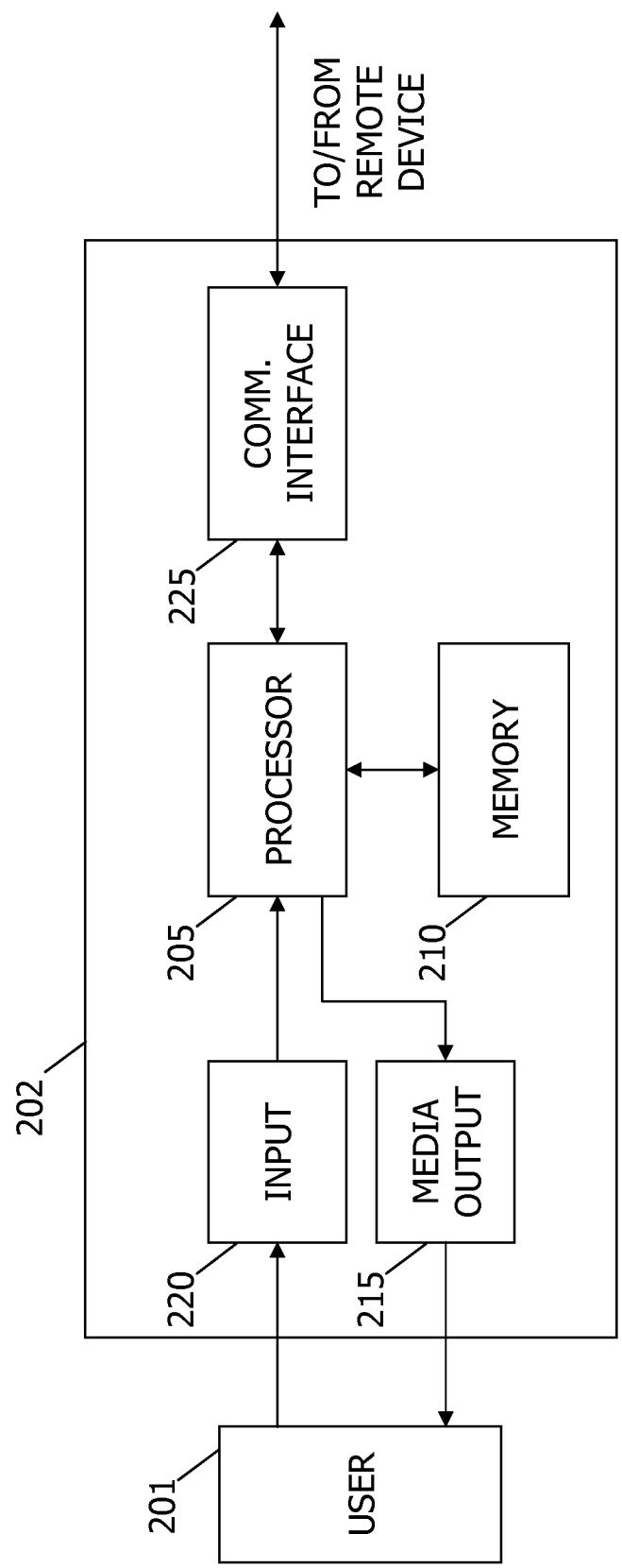

FIG. 3 illustrates an exemplary configuration of a user computer device 202 operated by a user 201. User computer device 202 may include, but is not limited to, client systems 114, 115, 138, 140, and 142, 146, POS terminal 118, workstation 154, and manager workstation 156 (shown in FIG. 2).

User computer device 202 includes a processor 205 for executing instructions. In some embodiments, executable instructions are stored in a memory area 210. Processor 205 may include one or more processing units (e.g., in a multi-core configuration). Memory area 210 is any device allowing information such as executable instructions and/or other data to be stored and retrieved. Memory area 210 may include one or more computer readable media.

User computer device 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, user computer device 202 includes an input device 220 for receiving input from user 201. Input device 220 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 215 and input device 220.

User computer device 202 may also include a communication interface 225, which is communicatively couplable to a remote device such as server system 112. Communication interface 225 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112. A client application allows user 201 to interact with a server application from server system 112.

Figure 4:
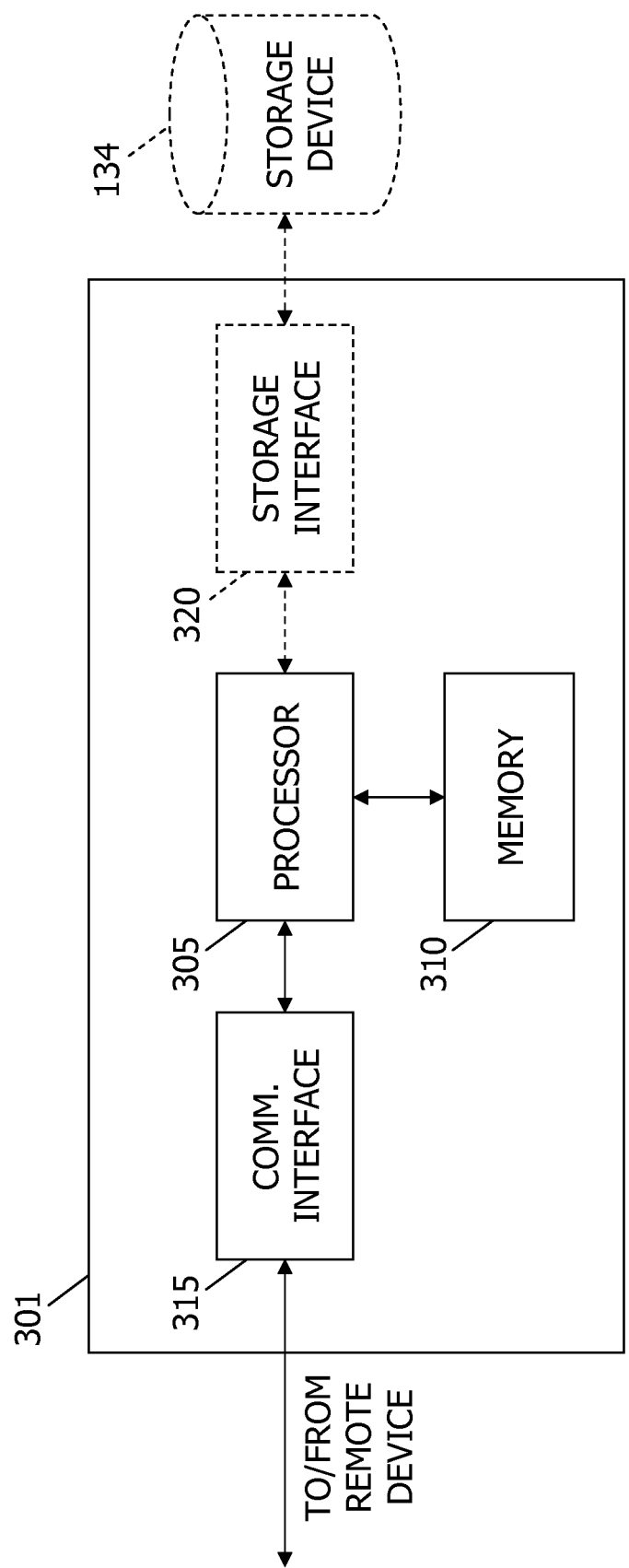

FIG. 4 illustrates an exemplary configuration of a server computer device 301 such as server system 112 (shown in FIGS. 1 and 2). Server computer device 301 may include, but is not limited to, database server 116, transaction server 124, web server 126, fax server 128, directory server 130, and mail server 132.

Server computer device 301 includes a processor 305 for executing instructions. Instructions may be stored in a memory area 310, for example. Processor 305 may include one or more processing units (e.g., in a multi-core configuration).

Processor 305 is operatively coupled to a communication interface 315 such that server computer device 301 is capable of communicating with a remote device such as user computer device 202 or another server computer device 301. For example, communication interface 315 may receive requests from user computer device 114, 115 via the Internet, as illustrated in FIGS. 1 and 2.

Processor 305 may also be operatively coupled to a storage device 134. Storage device 134 is any computer-operated hardware suitable for storing and/or retrieving data. In some embodiments, storage device 134 is integrated in server computer device 301. For example, server computer device 301 may include one or more hard disk drives as storage device 134. In other embodiments, storage device 134 is external to server computer device 301 and may be accessed by a plurality of server computer devices 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory areas 210 and 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 5:
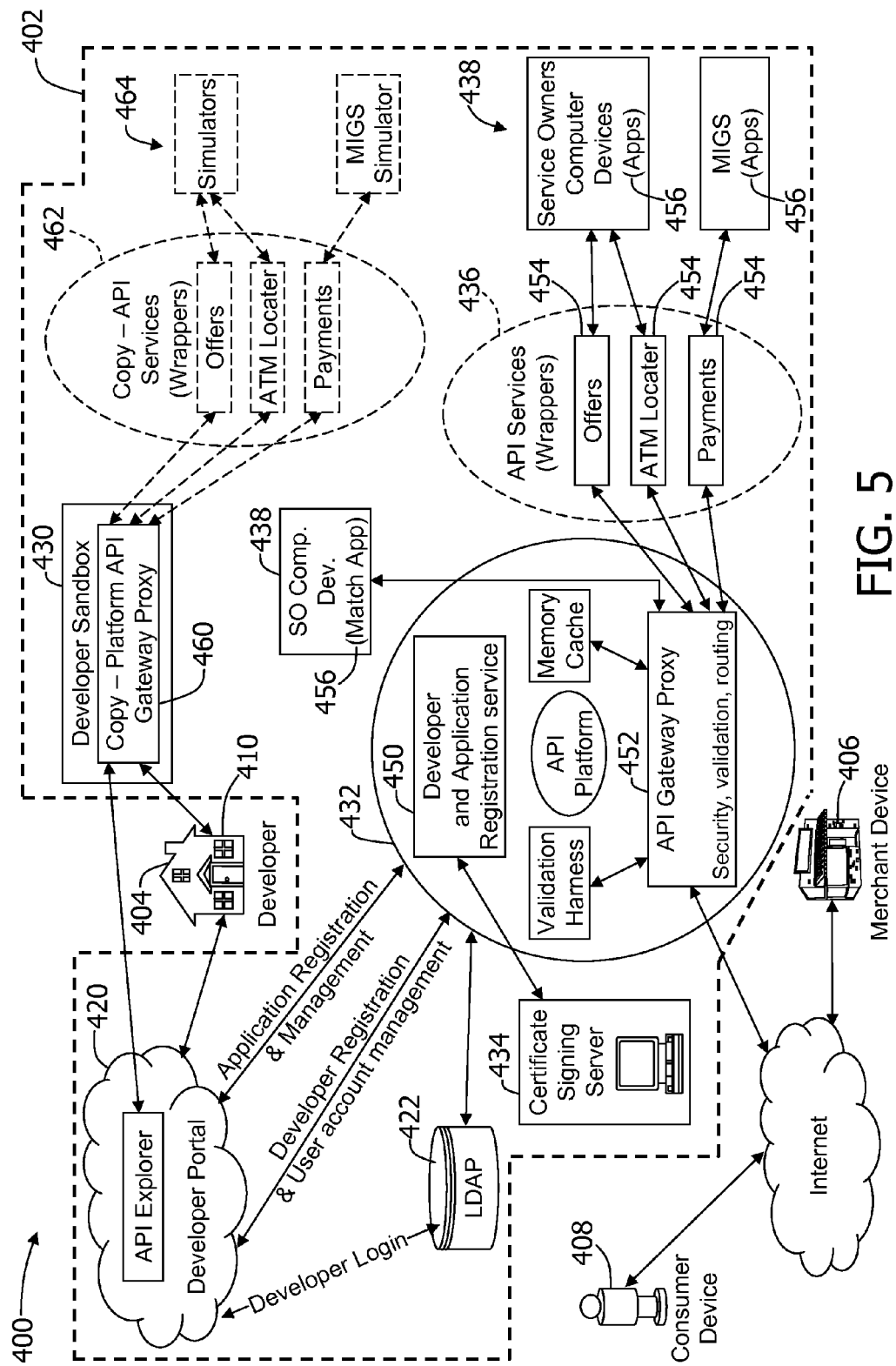

FIG. 5 illustrates an exemplary configuration of a service system 400 in accordance with the present invention. System 400 is similar to systems 100 and 122 (shown in FIGS. 1 and 2). In the example embodiment, system 400 includes a service provider computer system 402 such as SP server system 112 (shown in FIGS. 1 and 2), a developer computer device 404 such as developer computer device 114 (shown in FIGS. 1 and 2), a merchant computer device 406 such as user computer device 115 (shown in FIGS. 1 and 2), and a consumer computer device 408 such as user computer device 115 (shown in FIGS. 1 and 2).

Developer computer device 404 includes a processor for executing instructions. Instructions may be stored in a memory area. The memory area may also include one or more developer applications 410. Applications 410 include computer-implemented instructions that cause a computer device to interact with another computer device. For example, a developer may create an application 410 for locating ATMs included within a network of ATMs serviced by the SP (referred to as the "ATM Locator App"). The ATM Locator App can be stored within the memory area for use by computer device 404. Developer computer device 404 is in communication with SP computer system 402 through a developer portal 420, and through a developer sandbox platform 430. As explained below in greater detail, sandbox platform 430 is a test platform provided by SP computer system 402 that enables a developer to test its applications with test data before such applications are rolled out for processing live production data.

SP computer system 402 includes API portal 420, memory device 422, sandbox platform 430, API platform 432, certificate signing server 434, API services wrapper 436, and SO computer systems 438.

API portal 420 is configured to communicate with developer computer device 404, and facilitates managing developer registration and login with system 402. API portal 420 also enables developer computer device 404 to communicate with API platform 432. API portal 420 communicates with memory device 422 to facilitate a login by a developer.

API platform 432 includes a registration service 450 that is used to register developers and developer applications 410 with SP computer system 402. Registration service 450 is in communication with certificate signing server 434. API platform 432 also includes an API gateway proxy 452.

API platform 432 is in communication with API services wrapper 436. API services wrapper 436 includes wrappers 454 for each service application 456 provided by an SO within SP computer system 402. Service applications 456 are stored at SO computer systems 438. SO computer systems 438 are in communication with API platform 432 through API services wrapper 436 or may be connected directly with API platform 432 without a wrapper.

Continuing with the ATM Locator App example from above, SO computer devices 438 may include a service application 456 that includes data showing a location of each of the ATM machines included within the network serviced by the SP (referred to as the "ATM Locator Service"). In this example, the ATM Locator App, which is stored on developer computer device 404, is able to communicate with SO computer device 438 through API platform 432 and API services wrapper 436 by developer computer device 404 sending a data request to SO computer device 438, and by receiving a data response back from SO computer device 438. Developer computer device 404 is then able to display the location of all the ATMs within the SP network or at least some of the ATMs within the network.

Merchant computer device 406 and consumer computer device 408 each include a processor for executing instructions. Instructions may be stored in a memory area. The memory area may also include one or more developer applications 410 downloaded from developer computer device 404 for use by the merchant, consumer, acquirer, and/or issuer (collectively a "user"). In other words, a developer may develop an application that can be used by a user on their computer devices (e.g., a POS device, a personal computer, smart phone or PDA). The user downloads the application from the developer to their computer device for use by the user. When the user uses developer application 410, merchant and/or consumer computer devices 406, 408 communicate with SP computer system 402 through API platform 432. Continuing with the ATM Locator App example from above, the user can download the ATM Locator App from developer computer device 404. Consumer computer device 408 is then able to communicate with SO computer devices 438 through API platform 432 and API services wrapper 436 by sending a data request to SO computer devices 438, and by receiving a data response back from SO computer devices 438. Consumer computer device 408 is then able to display the location of all the ATMs within the SP network or at least some of the ATMs with the network.

As discussed above, SP computer system 402 includes a developer sandbox platform 430, which enables a developer to test its applications with test data before such applications are rolled out for processing live production data. Sandbox platform 430 includes a copy 460 of API gateway proxy 452, a copy 462 of API services wrapper 436, and simulator computer devices 464 which are configured to simulate SO computer devices 438. Sandbox platform 430 includes test data that allows a developer to test its applications 410 prior to rolling out applications 410 for production use.

In the example embodiment, a developer visits a web portal, referred to as API portal 420, designed specifically for SP computer system 402. At the home page, developers will be prompted to register with API platform 432. The registration process will collect, and authenticate as required, the following data elements from the developer: first name, last name, username, password, email address, country, street address, city, state/province, postal code, phone number, and company/university affiliation. Additionally, as a condition of registration, developers must opt-in to the program by affirmatively consenting to the terms and conditions and privacy notice. API portal 420 also includes a mechanism for the developers to request access to their information in the event that they desire to change, modify or delete such information.

Once registered and authenticated, developers can log into API portal 420 and access a variety of information regarding the various service applications 456 (e.g., service offerings such as payments, locators, offers, MATCH, etc.). Each service application 456 will have its own page(s) dedicated to describing the business requirements and specifications for that service in a format easily understood by non-industry developers.

Additionally, the developers will be able to log into API portal 420, register a key alias and request a sandbox key. The sandbox key allows developer's applications to access sandbox platform 430, which is an environment where developers can test and validate messages using service simulators 464.

Once a developer has been given a sandbox key, the developer can return to API portal 420 at any time and request a production key. A production key and client ID will be issued for the key alias used by the developer in the developer application. The client ID will identify which key alias is using API platform 432 to process messages and the developer that owns the production key. In the example embodiment, sandbox and production keys are not intended to be transferable or shared.

For every message that API platform 432 processes, the following will be logged: message request type; date and time received; path (message URL); IP address of sender; user agent of sender (name of sending application like IE, Firefox, or a different name); process time; and success or fail. If fail then, error information; client ID; key alias; user ID (system generated ID for developer account that owns the client ID); and unique message ID. There may be additional data elements collected based on the differing requirements of the various API service offerings. For example: for payments that have a merchant, a merchant ID will be logged in addition to the elements listed above.

In the example embodiment, a developer is required to register with SP computer system 402 to access certain information. However, an unregistered developer is able to access some information within SP computer system 402. For example, an unregistered developer can: review available API information, documentation and sample code; access certain functions; and access community pages and read forums. However, an unregistered developer cannot: post forum comments or blogs; create a key alias; or request a sandbox or production key.

API portal 420 provides a mechanism for developers to learn about the services that are available. They have the ability to: register; communicate with other developers via the forums; request keys for sandbox (testing) and production environments; view their personal dashboard; and view metrics on transactions for each key alias they have created. The keys provide message security between the developers and SP computer system 402.

SP computer system 402 allows a developer to interact with API sandbox platform 430. The developer uses sandbox platform 430 for testing and validating applications 410 by using simulators 464. The messages sent by developer applications 410 to API gateway proxy copy 460 are verified with a key. The key verifies that the message was not tampered with between the sender and SP computer system 402. The transaction in the message is authenticated by the backend simulator computer devices 464. The following data elements are collected from the developer during the sandbox key request process: (1) Key Alias: This is the alias the developer assigns to the key. It is used to present a user friendly identifier of the key on the dashboard. The dashboard is a web page on the portal website with the purpose of automatically displaying important information, objects, etc. (2) Description: The description of the key. It is assigned by the developer. Used on the dashboard to present the developer with a description of the key. (3) Use: This identifies if the key is for personal or commercial use. Personal use is an individual that intents to personally use or give to others for their personal use without charge. Commercial use is an individual that is developing for use by their employer or an individual that intends to sell their application to others. (4) Notes: This is free form notes that the developer can associate with the key. (5) Calls: This is the expected number of calls using the production key. It is assigned by the developer. Used by the SP for capacity planning. (6) Profitable: This identifies if the developer intends the key to be used to generate a profit. It is assigned by the developer. (7) Certificate: The SP signs the certificate and makes it available to the developer on the dashboard to download. The developer sandbox key is valid for testing all available API service applications with general access and any premium services that the developer, key alias and client ID have an approved production key.

SP computer system 402 assigns a production key to a developer. During this phase, the developer will be assigned a production key number and that key number will be provided to SP computer system 402 during each call. SP computer system 402 will use the production key number to control access and track developer activity throughout the process. In the example embodiment, an existing key alias and sandbox key are required prior to requesting a production key. The following data elements are collected from the developer during the production key request process: (1) Certificate: SP computer system 402 signs the certificate and makes it available to the developer on the dashboard to download. (2) Production Services Requested: This is a request for which services the production key will be valid.

A developer is able to engage a customer of the SP. The developer can build applications 410 for any of SP's business partners, including merchants, issuers, acquirers, or any other party in the SP network. The following examples describe a developer building a developer application 410 for a merchant user (the user could also be an individual, an acquirer, a processor or an issuer). The developer may be working directly for a merchant or for themselves to sell their application 410 to a merchant. The roles of the developer and merchant are separate. The SP does not have to be part of the relationship between the developer and the merchant. In some embodiments, the merchant may be required to have a relationship with the service application 456 being used, e.g. MiGS (MasterCard Internet Gateway System). The merchant and merchant acquirer would need to be registered with MiGS and have the credentials to prove that relationship is valid prior to using API platform 432.

In the example embodiment, the SP has a trust relationship with an existing merchant. The messages sent by merchant computer device 406 using developer application 410 to API gateway proxy 452 are verified with a key (public and private key). The key verifies that the message was not tampered with between the sender and API platform 432. The transaction in the message is authenticated by the backend service application 456. During this phase, customer authentication is managed by the SO of service application 456 being called.

In the example embodiment, SP computer system 402 includes a certificate signing request (CSR) and a key generation process. This process is started by the developer after registration on API portal 420. The keys/certificates are generated by the developer outside of SP computer system 402 with open source tools (like Open SSL). The SP does not own the developer's private or public key. A developer could theoretically use the same key with multiple open API's or programs not just the open API of the SP. The developer owns their private key, public key and CSR (Certificate Signature Request). The basic steps in the process are as follows: (1) the developer uses an open source tool and requests a CSR; (2) the tool provides a private and public key pair, and the public key is included in the CSR; (3) the developer uploads the CSR which contains the public key to API platform 432; (4) API platform 432 assigns a client ID and signs the developer's public key, wherein the combination of the client ID and the signed developer's public key comprises the production key; (5) the developer then uses the client ID (which is included in the production key) in each message sent to API platform 432 that is digitally signed with the private key on developer's computer device 404; (6) API platform 432 uses the client ID to identify which public key to use to verify the private key used to sign the message. Tools used to create keys and a CSR typically ask the developer to enter the following information when creating a CSR and key pair: name, organization, organizational unit, city, state or province, and country.

Figure 6:
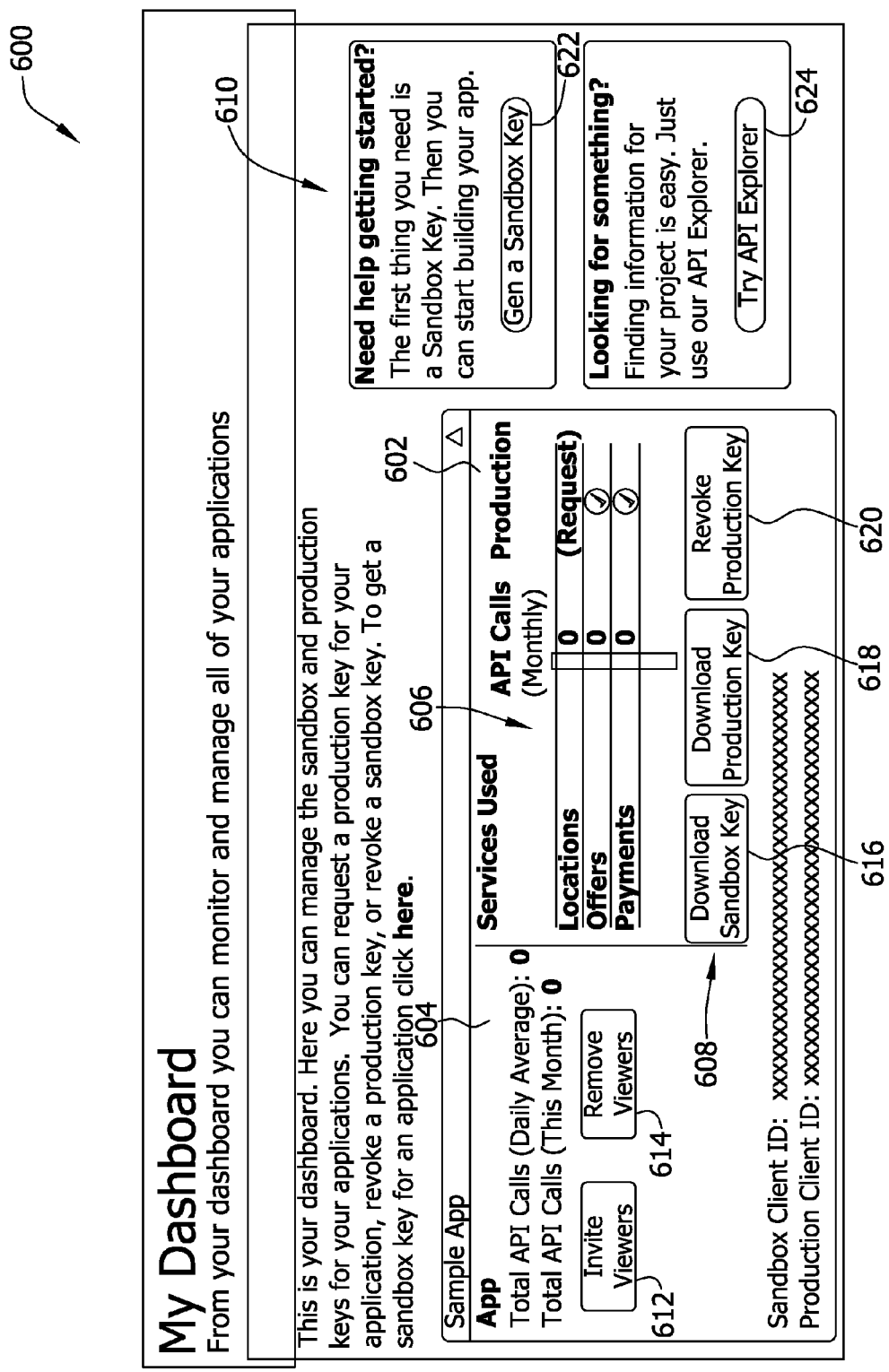

FIG. 6 is a screenshot of an open API developer dashboard 600 function of the web-based open API implementation portal, in accordance with exemplary embodiments of the present invention. Dashboard 600 is a web page on the portal website with the purpose of automatically displaying for example, but not limited to, important information and objects to facilitate monitoring and managing one or more developer programmed applications configured to use one or more services provided by a service owner. In the exemplary embodiment, dashboard 600 provides a summary view of a developer's key information regarding programmed applications under the developer's client identification number (client ID). Dashboard 600 is organized to provide a standard easy to understand layout that includes several areas of like information. Dashboard 600 includes at least one application area 602 associated with a corresponding programmed application, in the exemplary embodiment, named "sample app". Each at least one application area includes subareas including, for example, but not limited to a call metrics group 604 configured to display summarized metrics relative to service calls made by the programmed application, a services used group 606 configured to display a listing of each service called by the programmed application and metrics associated with each service, and a key management group 608 configured to prompt a developer of the programmed application to request or revoke a key, wherein the key includes a developer identification, a programmed application identification, and signed certificates relating to services used by the programmed application. Application area also includes a side bar area 610 configured to prompt a developer to request information or help relating to the application area.

Dashboard 600 is a link-enabled system that extracts information from different areas in service provider computer system 100 and displays that information for user reference. Dashboard 600 also organizes and presents links to other web pages that include specific functionality for managing the programmed applications associated with a developer represented by a client ID.

Call metrics group 604 includes a quick link 612 to a web page or a pop-up window for managing viewers of a developer's dashboard 600. Another quick link 614 is used to remove viewers from being able to view the developer's dashboard 600.

Key management group 608 includes a quick link 616 for downloading a sandbox key. A sandbox is a temporary or segregated memory area in service provider computer system 100 that simulates a portion of service provider computer system 100 but, can not make any changes or even access production areas of service provider computer system 100. The sandbox is a testing location provided to developers for familiarizing developers with the capabilities of the API services offered. The sandbox key allows developer's applications to access an environment where they can test and validate messages using open API service simulators.

Data elements collected from the developer during the sandbox key request process include a Key Alias, which is an alias the developer assigns to the key. The Key Alias is used to present a user friendly identifier of the key on dashboard 600. A description of the key is a required element and is assigned by the developer. The key description is used on dashboard 600 to present the developer with a description of the key. A use for the application is a required data element and identifies if the key is for personal or commercial use. Personal use is an individual that intends to personally use or give to others for their personal use without charge. Commercial use is an individual that is developing for use by their employer or an individual that intends to sell their application to others. A notes element is optional and is a free form notes area the developer can associate with the key. A Calls element is required and represents an expected estimated number of service calls anticipated using the production key. The number of Calls is assigned by the developer and used by the service provider for capacity planning. A profitable data element identifies if the developer intends the key to be used to generate a profit. A Certificate data element is required. The service provider signs the certificate and makes it available to the developer on dashboard 600 to download.

Key management group 608 also includes a quick link 618 for downloading a production key. Once a developer has been given a sandbox key the developer can return to dashboard 600 and request a production key. A production key and client ID will be issued for the key alias used by the developer in their application. The key alias is a nickname or registered name that is an alias for a key, also referred to an on dashboard 600. The client ID identifies which key alias is using the open API platform to process messages and the developer that owns the production key. Further, key management group 608 includes a quick link 620 that allows a developer to revoke a production key.

Side bar area 610 includes a quick link 622 that opens a webpage that permits a developer to request an API key, which is a first step to using the open API function of service provider computer system 100. A quick link 624 permits a developer access to an API Explorer application. The API Explorer is a tool on a web page that assists the developer in creating an API request message for a specific API service that is offered. It then allows the developer to view a structure of a return message that fulfills the requirements of the API request message.

FIG. 7 is a screen shot of a pop-up window 700 that may be called from dashboard 600 (shown in FIG. 6) in accordance with an exemplary embodiment of the present invention. In the exemplary embodiment, window 700 includes a contact box 702 that prompts a developer to input contact information for a user to be added as a viewer on dashboard 600 associated with the developer. In the exemplary embodiment, the contact information is the user's email address, however other methods of contact are also anticipated such as, but not limited to, SMS address, IM, AIM addresses, etc.

Figure 8:
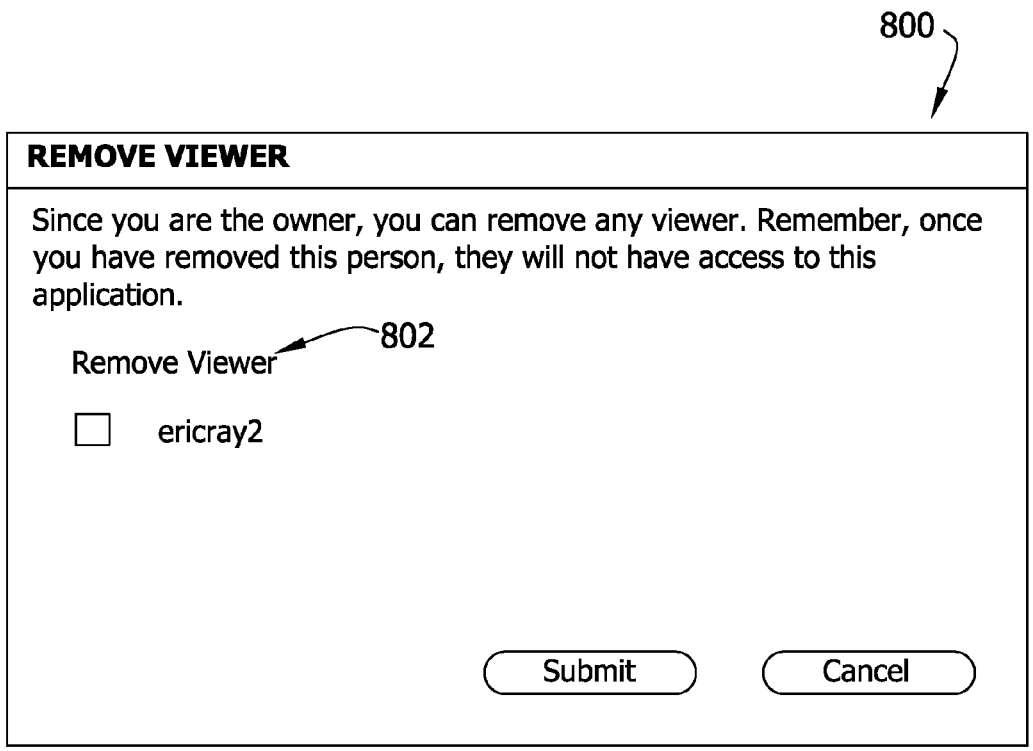

FIG. 8 is a screen shot of a pop-up window 800 that may be called from dashboard 600 (shown in FIG. 6) in accordance with an exemplary embodiment of the present invention. In the exemplary embodiment, window 800 includes a listing 802 of invited viewers associated with a dashboard 600 associated with the developer. A check box 804 prompts a developer to select one or more of the invited viewers in listing 802 for removal as a viewer.

Figure 9:
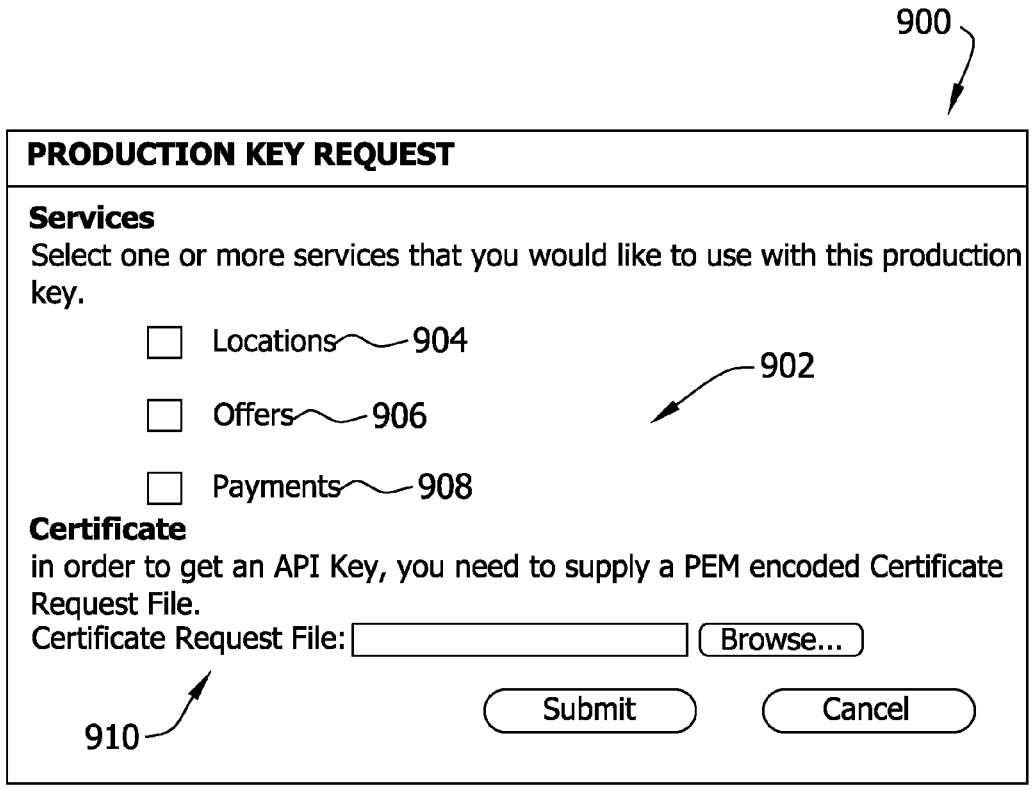

FIG. 9 is a screen shot of a pop-up window 900 that may be called from dashboard 600 (shown in FIG. 6) in accordance with an exemplary embodiment of the present invention. Window 900 is available after selecting quick link 618 on dashboard 600 to download a production key. In the exemplary embodiment, window 900 includes a listing 902 of services that may be requested to be accessed using the requested production key. A locations service provides a developer access to street address or other coordinate locations of for example, but not limited to, ATMs, merchants, banks, and gas stations. An offers service 906 provides a developer access to information regarding sales, deals, and other offers that enhance a transaction cardholder buying experience. A payments service permits a developer access to card payments using the developer's programmed application. A certificate area 910 permits the developer to enter an encoded certificate request file location. The certificate request file location is required to receive a production key.

FIG. 10 is a screen shot of a pop-up window 1000 that may be called from dashboard 600 (shown in FIG. 6) in accordance with an exemplary embodiment of the present invention. In the exemplary embodiment, window 1000 includes an application type selection 1002 for selecting an intended use of the application being developed. The selections include, for example, but are not limited to, personal and commercial. An application information area 1004 includes text boxes for identifying and descriptive information for the programmed application being developed. A first text box 1006 prompts the developer to enter a name of the application, a second text box prompts the developer for a description of the programmed application being developed. Additional notes may be entered into a third text box 1010 and the APIs that are anticipated as being necessary for use by the application being developed are identified and selected in a dropdown box 1012 that provides a list of available APIs from which to make a selection. A selection box prompts the developer to selection whether the programmed applications intended to make a profit or not. A certificate area 1016 permits the developer to enter an encoded certificate request file location. The certificate request file location is required to receive a production key. After a submit button 1018 is selected the entered information is processed and an API key is returned to the developer.

Figure 11:
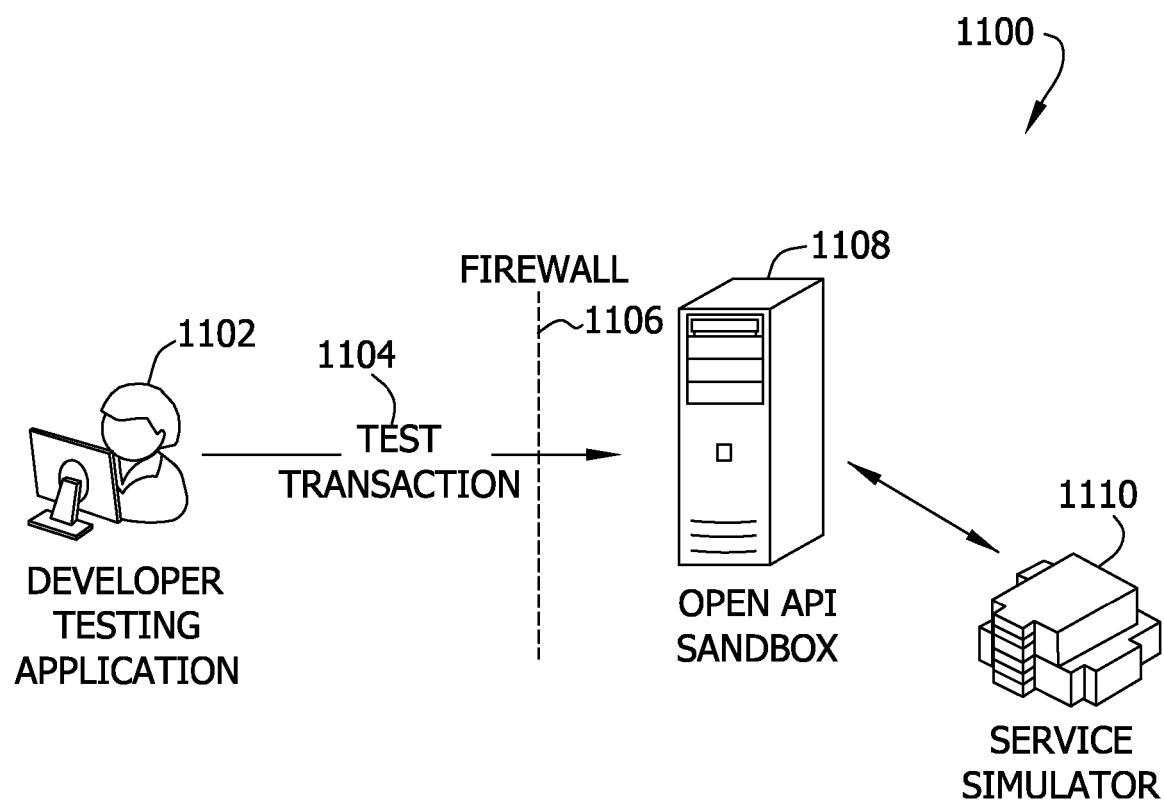

FIG. 11 is a schematic data flow diagram 1100 illustrating a developer's interaction with the service provider Open API sandbox environment. In the exemplary embodiment, the developer downloads a sandbox key using quick link 616 (shown in FIG. 6) and uses the sandbox key to access the sandbox, which is a copy of the service provider Open API services in a test/validation environment using simulators. An application 1102 programmed by the developer transmits a test transaction message 1104 through a service provider firewall 1106 to an Open API gateway 1108 and is verified using the sandbox key. The key verifies that the message was not tampered with between the sender and the service provider. The transaction in the message is authenticated by a backend service provider service simulator 1110.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 205, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is includes receiving, through a graphical user interface (GUI), a request for an application programming interface (API) key associated with a programmed application by a developer wherein the API key permits interaction of the programmed application and an API platform comprising a plurality of APIs. The technical effect also includes receiving, through the graphical user interface (GUI), developer identification data specific to the developer and the programmed application, generating a client identification number associated with the key request using the developer identification data, and generating at least one of a temporary memory programmed application key and a production programmed application key. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of a method and system of managing programmed applications in an open API environment provides a cost-effective and reliable means to facilitate interfacing with an API platform and executing the programming application in a sandbox testing environment. More specifically, the method and systems described herein facilitates reporting a status of the one or more programmed applications. As a result, the method and systems described herein facilitate managing the one or more programmed applications in a cost-effective and reliable manner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method executable by a central processing unit (CPU) of a financial transaction service provider for managing one or more programmed applications, said method comprising:
receiving, from a developer of the one or more programmed applications, through a graphical user interface (GUI), a request for an application programming interface (API) key associated with the one or more programmed applications, the API key permitting interaction of the one or more programmed applications and an API platform comprising a plurality of APIs, the APIs configured to service requests for data stored by the service provider through an open application programming interface, said API key including at least one of a temporary memory sandbox key and a production key, said sandbox key configured to permit access to a programmed application testing memory, said production key configured to permit access to available services based on an approval by a service owner;

receiving, through the GUI, developer identification data specific to the developer and at least one of the one or more programmed applications;

generating a client identification (ID) number associated with the key request using the developer identification data; and generating at least one production programmed application key that includes the client identification number and a signed public key of the developer, where the client ID is associated with a plurality of certificates signed by the service provider, which each are associated with a plurality of service applications of the service provider, the service applications configured to access the data stored by the service provider.

2. A method in accordance with claim 1, wherein the GUI comprises a dashboard configured to facilitate interfacing with the API platform, programming the programmed application, executing the programmed application in a temporary memory location, report a status of the one or more programmed applications, and manage the one or more programmed applications.

3. A method in accordance with claim 1, wherein the GUI comprises a dashboard associated with the developer, the dashboard configured to receive an identification of a potential viewer of the dashboard from the developer, the dashboard permitting dashboard viewing by the potential viewer if the potential viewer is registered.

4. A method in accordance with claim 1, further comprising displaying statistical information relative to use of at least one programmed application by users of the programmed application.

5. A method in accordance with claim 4, wherein displaying statistical information comprises displaying at least one of a rate of programmed application calls, a total of programmed application calls, an indication of services used by the users of the programmed application, and a tally of services used by the users of the programmed application for a predetermined time period.

6. A method in accordance with claim 1, wherein receiving developer identification data comprises receiving at least one of a purpose of the programmed application, a description of the programmed application, a frequency of use of the programmed application, and an expected profitability of the programmed application.

7. A method in accordance with claim 1, further comprising receiving from the developer a certificate request file.

8. A method in accordance with claim 7, wherein receiving from the developer a certificate request file comprises receiving from the developer an encoded certificate request file.

9. A method in accordance with claim 7, wherein receiving from the developer a certificate request file comprises receiving from the developer a certificate request file encoded using Privacy Enhanced Mail (PEM) format.

10. A method in accordance with claim 1, wherein generating a client identification number comprises generating at least one of a sandbox client identification (ID) number and a production client ID number.

11. A method in accordance with claim 1, further comprising initiating execution of the programmed application in a temporary, contained memory.

12. An open application programming interface (API) dashboard system for monitoring and managing one or more developer programmed applications configured to use one or more services provided by a service owner, said system stored in a memory and comprising:

at least one application area associated with a corresponding programmed application configured to provide the developer with information for monitoring and managing one or more developer programmed applications, each at least one application area including:

a call metrics group configured to display summarized metrics relative to service calls made by the programmed application, the service calls relating to service provider data provided to the developer application in response to a request from a customer of the developer application;

a services used group configured to display, to the developer, a listing of each service called by the programmed application and metrics associated with each service; and a key management group configured to prompt the developer of the programmed application to request or revoke a key, wherein the key includes a developer identification, a programmed application identification, and one or more certificates signed by the service provider and relating to services used by the programmed application, said key comprising at least one of a temporary memory sandbox key and a production key, said sandbox key configured to permit access to a programmed application testing memory, said production key configured to permit access to available services based on an approval by a service owner; and a side bar area configured to prompt the developer to request information or help relating to the at least one application area.

13. A system in accordance with claim 12, wherein said dashboard comprises a key request page accessible to the developer though a key request input in said key management group.

14. A system in accordance with claim 13, wherein said key request page comprises an application type area configured to prompt the developer to identify a use for the programmed application associated with the key request.

15. A system in accordance with claim 13, wherein said key request page comprises an application information area configured to prompt the developer to identify the programmed application, the identification including at least one of a programmed application name and a programmed application description.

16. A system in accordance with claim 13, wherein said key request page comprises a certificate request area configured to prompt the developer to upload an encoded certificate request file.

* * * * *